US012708949B2

(12) United States Patent
Burtscher

(10) Patent No.: US 12,708,949 B2
(45) Date of Patent: Aug. 18, 2026

(54) TOOL FOR CUTTING PROCESSING AND USE OF A CUTTING INSERT THEREON

(71) Applicant: Ceratizit Austria Gesellschaft m.b.H., Reutte (AT)

(72) Inventor: Peter Burtscher, Reutte (AT)

(73) Assignee: Ceratizit Austria Gesellschaft m.b.H., Reutte (AT)

( * ) Notice: Subject to any disclaimer, the term of this patent is extended or adjusted under 35 U.S.C. 154(b) by 567 days.

(21) Appl. No.: 18/258,613

(22) PCT Filed: Dec. 7, 2021

(86) PCT No.: PCT/EP2021/084514
§ 371 (c)(1),
(2) Date: Jun. 21, 2023

(87) PCT Pub. No.: WO2022/135899
PCT Pub. Date: Jun. 30, 2022

(65) Prior Publication Data

US 2024/0042533 A1 Feb. 8, 2024

(30) Foreign Application Priority Data

Dec. 21, 2020 (EP) .................................... 20216165

(51) Int. Cl.
*B23C 5/22* (2006.01)

(52) U.S. Cl.
CPC ...... *B23C 5/2213* (2013.01); *B23C 2210/161* (2013.01); *B23C 2210/165* (2013.01)

(58) Field of Classification Search
CPC ........... B23C 5/2213; B23C 2210/161; B23C 2210/165; B23C 5/2304; B23C 5/22;
(Continued)

(56) References Cited

U.S. PATENT DOCUMENTS 3,805,351 A 4/1974 Mayer
3,854,183 A * 12/1974 Roos .................. B23B 27/1662
407/104

(Continued)

FOREIGN PATENT DOCUMENTS

CN 106624100 A 5/2017
EP 1083017 A1 3/2001

(Continued)

*Primary Examiner* — Sarang Afzali
*Assistant Examiner* — Darrell C Ford
(74) *Attorney, Agent, or Firm* — Laurence A. Greenberg; Werner H. Stemer; Ralph E. Locher

(57) ABSTRACT

A tool for cutting processing has a base member which has a rotation axis about which the tool rotates during operation, a seat which is formed on the base member for receiving a replaceable cutting insert, a securing screw for securing the cutting insert to the seat, and a cutting insert which is secured to the seat. The seat has a base face for supporting a lower side of the cutting insert, a first lateral abutment face which supports the cutting insert in a radially inward direction, and a second lateral abutment face which supports the cutting insert axially and in a radially outward direction and a hole for receiving the securing screw is formed in the base face. The hole has with spacing from the base face a threaded hole and closer in the direction of the base face a thread-free hole portion.

21 Claims, 5 Drawing Sheets

(58) Field of Classification Search
CPC ....... B23C 5/2204; B23C 5/222; B23C 5/202; B23C 2200/045; B23C 2210/16; B23C 2240/24; B23C 2270/08; B23B 27/1662; B23B 2205/04; B23B 2205/045; B23B 2270/08
See application file for complete search history.

(56) References Cited

U.S. PATENT DOCUMENTS

| | | | | |
|---|---|---|---|---|
| 4,283,163 | A | 8/1981 | Graefe et al. | |
| 5,160,228 | A | 11/1992 | Arai et al. | |
| 5,938,377 | A | 8/1999 | Jordberg et al. | |
| 6,413,021 | B1 | 7/2002 | Koch et al. | |
| 6,709,204 | B2 * | 3/2004 | Hellstrom | B23B 27/1662 407/104 |
| 7,597,507 | B2 | 10/2009 | Sakamoto et al. | |
| 10,286,459 | B2 | 5/2019 | Burtscher et al. | |
| 2008/0304928 | A1 * | 12/2008 | Engstrom | B23C 5/2247 408/229 |
| 2017/0239736 | A1 * | 8/2017 | Burtscher | B23C 5/2208 |

FOREIGN PATENT DOCUMENTS

| | | | |
|---|---|---|---|
| JP | H03281115 | A | 12/1991 |
| JP | 2007223020 | A | 9/2007 |
| KR | 1020000005548 | A | 1/2000 |
| WO | 2016081964 | A1 | 6/2016 |

* cited by examiner

TOOL FOR CUTTING PROCESSING AND USE OF A CUTTING INSERT THEREON

FIELD AND BACKGROUND OF THE INVENTION

The present invention relates to a tool for cutting processing and a use of a cutting insert on such a tool.

During cutting processing of in particular metal materials and increasingly also composite material, tools are often used in which the blades which move into engagement with the material to be machined are formed on replaceable cutting inserts which are formed from a hard and wear-resistant material and which are arranged on seats which are provided for this purpose on a base member which is formed from a tougher material, such as in particular, for example, tool steel. The replaceable cutting inserts are in this instance often in the form of so-called indexable inserts or indexable cutting inserts which have a plurality of blades which can be brought one after the other in an active cutting position on the base member when the respective previous blade is worn. The cutting inserts may in this instance typically be formed from hard metal (cemented carbide), Cermet or a ceramic cutting material.

In tools which are configured for a cutting processing by means of milling, the base member has a rotation axis about which the bae member rotates during operation of the tool. The base member may, for example, have only one seat for receiving a replaceable cutting insert. Typically, however, a plurality of such seats which are arranged in a state distributed over the circumference of the base member of the tool are provided. In order to increase the productivity during cutting with such tools, there is a trend towards operating the tools with suitable materials at increasingly high speeds and configuring them as so-called high-speed millers or high-speed cutters in which the speeds are often several tens of thousands of revolutions per minute.

During operation of such tools at very high speeds, in addition to the cutting forces which typically occur and which act primarily in the tangential direction and the axial direction, in particular the centrifugal forces which act as a result of the high speeds on the cutting inserts, also pose a problem. In so far as the terms radial, axial and tangential are used in the following description, these refer in each case to the rotation axis of the base member of the tool as long as no other reference can be derived from the specific context.

The high centrifugal forces may, for example, in the event that the cutting insert is secured to the seat by means of a securing screw, lead to the position of the cutting inserts on their seats on the base member being changed and may also in an extreme case lead to a failure of the securing screw so that the cutting insert becomes detached from the seat. If this occurs during the cutting processing operation, this can lead to damage to the workpiece which is intended to be processed and additionally represents a safety risk.

EP 1 083 017 A1 describes a cutting tool for high-speed processing, wherein the seat for receiving a replaceable cutting insert is provided with a shape which cooperates to some degree in a positive-locking manner with the lower side of the cutting insert.

SUMMARY OF THE INVENTION

An object of the present invention is to provide an improved tool for cutting processing at high rotation speeds, an improved use of a cutting insert and an improved method for securing a cutting insert in which a cutting insert is reliably supported in a manner which is non-sensitive with respect to production tolerances against active centrifugal forces and the clamping force with which the cutting insert is clamped in a seat can be predetermined within a narrower range.

The objective is achieved with a tool for cutting processing according to the independent tool claim. Advantageous developments are set out in the dependent claims.

The tool has a base member which has a rotation axis about which the tool rotates during operation, at least one seat which is formed on the base member for receiving a replaceable cutting insert, a securing screw for securing the cutting insert to the seat, and a cutting insert which is secured to the seat. The seat has a base face for supporting a lower side of the cutting insert, a first lateral abutment face for abutting against a first lateral face of the cutting insert, which first lateral abutment face supports the cutting insert in a radially inward direction, and a second lateral abutment face for abutting against a second lateral face of the cutting insert, which second lateral abutment face supports the cutting insert axially and in a radially outward direction. A hole for receiving the securing screw is formed in the base face. The hole has with spacing from the base face a threaded hole and closer in the direction of the base face a thread-free hole portion. The securing screw has a threaded portion for cooperating with the threaded hole, a head portion for supporting in a through-hole of the cutting insert and between the threaded portion and the head portion a thread-free shaft portion, which thread-free shaft portion has a smaller cross section than the thread-free hole portion. The cutting insert is secured to the seat in such a manner that the head portion of the securing screw is supported on the through-hole of the cutting insert, the threaded portion of the securing screw cooperates with the threaded hole and the head portion of the securing screw is resiliently deflected in such a manner that the thread-free shaft portion is supported when viewed in a direction perpendicular to the base face in a second quadrant which is located in a radially outward direction and axially in the direction of a free end of the tool on the thread-free hole portion.

In a viewing direction perpendicular to the base face, the hole has four quadrants of which two (a third quadrant and a fourth quadrant) are located radially inwards, that is to say, closer to the rotation axis of the base member, and two (a first quadrant and a second quadrant) are located radially at the outer side, that is to say, further away from the rotation axis of the base member. One of the quadrants located at the radially inner side, the third quadrant, and one of the quadrants of the hole located at the radially outer side, the second quadrant, are located in each case axially in the direction of the free end of the tool, which will also be referred to below as "axially at the front". The other one of the radially internal quadrants, the fourth quadrant, and the radially outer quadrant, the first quadrant, is located in each case facing away from the free end of the tool, that is to say, in the direction of the clamping end of the tool, which will also be referred to below as "axially at the rear". There is consequently—when viewed in the clockwise direction—a radially outer first quadrant which faces away from the free end, a radially outer second quadrant which is located axially in the direction of the free end, a radially inner third quadrant which is located axially in the direction of the free end and a radially inner fourth quadrant which faces away from the free end.

Since the second lateral abutment face is provided to abut against a second lateral face of the cutting insert, which face supports the cutting insert axially and in a radially outward direction, and in addition the securing screw is deflected in such a resilient manner that the thread-free shaft portion is supported in the radially outer second quadrant which is located axially in the direction of the free end of the tool on the thread-free hole portion, the cutting insert is supported at two positions which are spatially spaced apart from each other in a positive-locking manner against centrifugal force so that a drifting of the cutting insert from the seat even at high speeds of the tool is reliably prevented. Since the support of the thread-free shaft portion on the thread-free hole portion is carried out by means of a resilient deflection of the head portion and the thread-free shaft portion of the securing screw, production tolerances of the first and second lateral abutment faces, the hole and the securing screw can be reliably compensated for by means of the resilient deformation of the securing screw. Furthermore, the clamping force with which the cutting insert is clamped on the seat can be predetermined by means of the resilient properties of the clamping screw.

According to a development, the thread-free shaft portion in a fourth quadrant, which is located in a radially inward direction and faces away from the free end of the tool, is spaced apart from the thread-free hole portion. The thread-free hole portion consequently has a corresponding excess dimension with respect to the thread-free shaft portion of the securing screw so that it can be resiliently deflected in an unimpeded manner until the thread-free shaft portion abuts the thread-free hole portion in the quadrant which is located in a radially outward direction and in the direction of the free end of the tool. In this manner, tolerances of the cutting insert and the lateral abutment faces can be particularly well compensated for. Preferably, the thread-free shaft portion is also spaced apart from the thread-free hole portion in the first quadrant and in the third quadrant.

When the head portion of the securing screw is deflected resiliently in a radially outward direction and axially in the direction of the free end of the tool, the cutting insert is clamped in a particularly reliable manner against both the first lateral abutment face and the second lateral abutment face.

According to a development, the first lateral abutment face and the second lateral abutment face enclose in a viewing direction perpendicular to the base face an angle<75° with each other. In this instance, the cutting insert is enclosed in a particularly reliable manner in a positive-locking manner and consequently secured against active centrifugal forces. Preferably, the angle may be <65°. In this case, the angle enclosed by the first lateral abutment face and the second lateral abutment face is preferably >35°, more preferably >40°, in order to provide a reliable enclosure of the cutting insert on the seat.

According to a development, the head portion of the securing screw has a largest cross section perpendicularly to an axis of the securing screw which is greater than a smallest cross section of the through-hole. In other words, in this instance, the head portion of the securing screw cannot be guided through the through-hole of the cutting insert. In this instance, the cutting insert is secured to the seat in a particularly reliable, positive-locking manner.

According to a development, a longitudinal axis of the threaded hole is offset in a plane of the contact between the head portion of the securing screw and the through-hole of the cutting insert with respect to the longitudinal axis of the through-hole in the direction towards the first lateral abutment face and in the direction towards the second lateral abutment face. In this instance, the cutting insert is reliably clamped in the direction of the first lateral abutment face and in the direction of the second lateral abutment face and the thread-free shaft portion of the securing screw is reliably brought into abutment with the thread-free hole portion by means of resilient deflection.

When a surface normal of the first lateral abutment face has a radially outwardly directed direction component as a main component, the first lateral abutment face then supports the cutting insert in a particularly reliable manner with respect to radially inwardly acting forces. In addition to the radially outwardly directed direction component, the surface normal may also have smaller direction components in terms of value in the axial direction and/or the tangential direction.

According to a development, a surface normal of the second lateral abutment face has an axial direction component and a radially inwardly directed direction component. In this instance, the cutting insert is reliably supported by means of the second lateral abutment face with respect to axially acting forces and with respect to centrifugal forces. The surface normal of the second lateral abutment face may further also have a—smaller in terms of value—tangential direction component.

According to a development, a surface normal of the base face has a tangential direction component as a main component. In this instance, the cutting insert is supported on the seat in a particularly reliable manner with respect to the cutting forces which act primarily in the tangential direction. The surface normal of the base face may further also have smaller direction components in terms of value in the radial direction and/or the axial direction.

According to a development, the wall of the thread-free hole portion at least in the second quadrant, which is located in a radially outward direction and axially in the direction of the free end of the tool, of the hole is constructed to be curved in a concave manner at the hole side in the circumferential direction. In this instance, tolerances in the region of the first lateral abutment face and the second lateral abutment face and the cutting insert which cooperates therewith are compensated for in a particularly reliable manner in that the contact region of the thread-free shaft portion on the thread-free hole portion with the resilient deflection of the head portion can be adjusted within a larger angular range in the second quadrant.

According to a development, the thread-free hole portion has a substantially circular cross section. In this instance, the thread-free hole portion can be constructed in a particularly simple and cost-effective manner. However, it is also possible to form the thread-free hole portion with a cross sectional shape which differs from a circular cross section.

According to a development, the thread-free hole portion is constructed parallel with the threaded hole. This enables a particularly simple and cost-effective production both of the hole and of the securing screw which is received therein. Preferably, the thread-free hole portion is constructed coaxially relative to the threaded hole.

According to a development, the tool is a high-speed milling cutter which is configured for a cutting processing operation at speeds of more than 10,000 revolutions per minute. Particularly with such tools which are configured for processing at a high speed, a reliable securing against active centrifugal forces is particularly significant.

The object is also achieved by using a cutting insert on such a tool according to the independent cutting insert claim. During use, the advantages which have been described above with reference to the tool are achieved.

The object is also achieved with a method for securing a cutting insert according to the independent method claim.

In the method for securing a cutting insert to a seat of a base member of a tool, the base member has a rotation axis about which the tool rotates during operation and the seat has a base face for supporting a lower side of the cutting insert, a first lateral abutment face which supports the cutting insert in a radially inward direction, and a second lateral abutment face which supports the cutting insert axially and in a radially outward direction. A hole for receiving a securing screw is formed in the base face and the hole has with spacing from the base face a threaded hole and closer in the direction of the base face a thread-free hole portion. The method has the following steps:

- placing the cutting insert on the seat so that the lower side thereof is supported on the base face, a first lateral face is supported on the first lateral abutment face and a second lateral face is supported on the second lateral abutment face,
- guiding a threaded portion of a securing screw through a through-hole in the cutting insert and into the hole so that the threaded portion moves into engagement with the threaded hole and a thread-free shaft portion which is arranged between the threaded portion and a head portion of the securing screw comes to rest with spacing all around in the thread-free hole portion, and
- screwing in the securing screw so that the head portion initially moves into abutment with the through-hole at a radially inner side facing away from a free end of the base member and subsequently the head portion and the thread-free shaft portion are resiliently deflected in a radially outward direction and in the direction of the free end of the base member until the thread-free shaft portion moves into abutment with a second quadrant, which is located in a radially outward direction and axially in the direction of the free end, of the thread-free hole portion.

The advantages which are described above with reference to the tool are achieved with the method. The advantageous developments described with reference to the tool can advantageously also be used with the method.

Other advantages and favourable features of the invention will be appreciated with reference to the following description of an embodiment and the appended Figures.

DETAILED DESCRIPTION OF THE INVENTION

One embodiment is described below in greater detail with reference to the Figures.

The tool 100 for cutting processing is in the embodiment which is specifically illustrated in the form of a milling tool, in particular a high-speed milling tool which is configured for processing at a speed of up to several tens of thousands of revolutions per minute.

The tool 100 has a base member 1 which may, for example, be formed from a tool steel, tungsten heavy metal, such as Densimet® or a hard metal. The base member 1 has a first end 11 which is provided with an interface for indirect or direct connection to a drive spindle of a processing machine (not illustrated) and a free end 12 which faces away from the first end 11. The base member 1 has a rotation axis R about which the tool 100 rotates during operation, that is to say, during a cutting processing operation.

Figure 1:
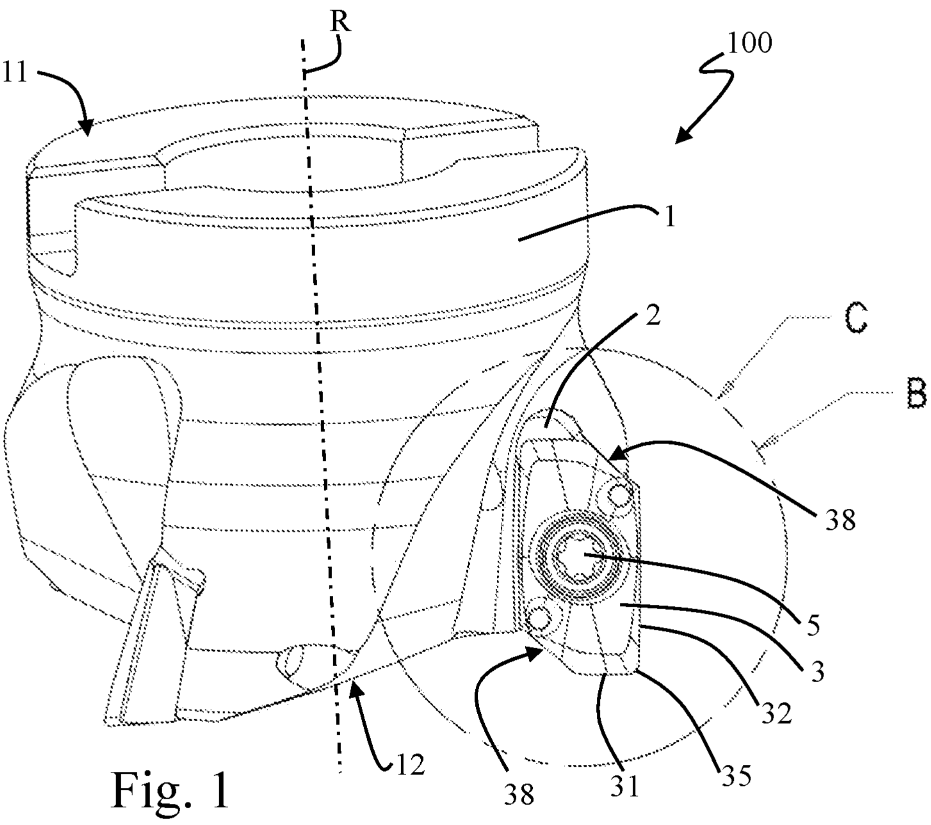
FIG. 1: shows a perspective view of a tool according to one embodiment.
Figure 6:
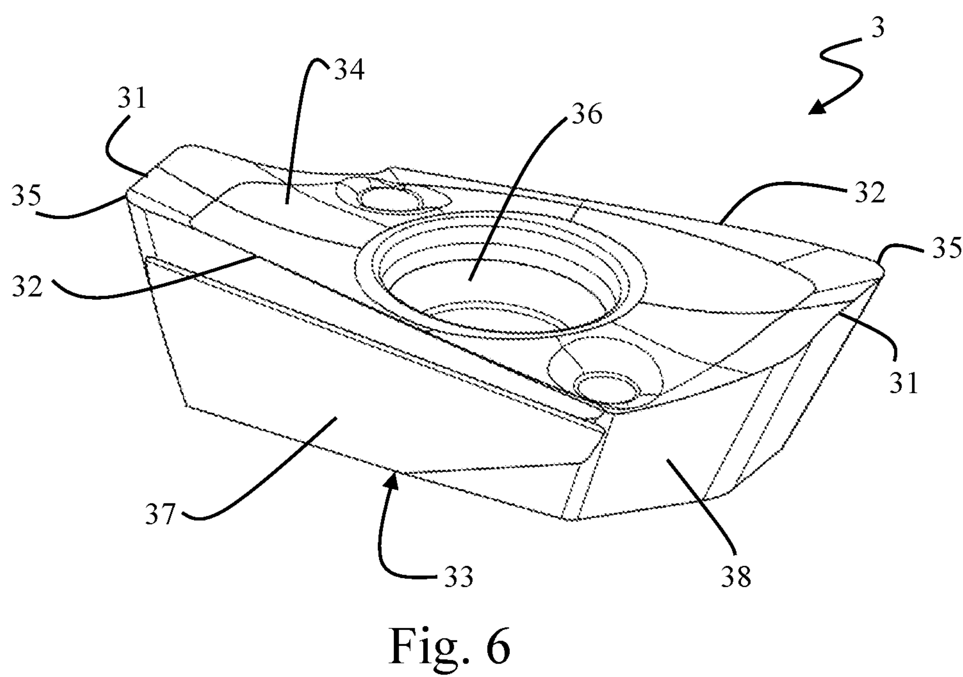
FIG. 6: shows a schematic, perspective illustration of the cutting insert in the embodiment.

As can be seen in FIG. 1, in the region of the free end 12 in the base member 1 a plurality of seats 2 for receiving replaceable cutting inserts 3 are provided. The seats 2 are arranged in a state distributed over the circumference of the base member 1. Although in the embodiment which is specifically illustrated a base member 1 which has a total of four seats 2 for receiving replaceable cutting inserts 3 is shown, fewer such seats 2, but at least one, or more than four seats 2 may also be provided. The seats 2 are arranged in such a manner that a cutting insert 3 which is arranged therein in each case protrudes axially with an auxiliary blade 31 over the free end 12 of the base member 1 and protrudes radially with a main blade 32 over the base member 1. The seats 2 are constructed for a so-called radial clamping of the cutting inserts 3, in which the main extent plane of the cutting insert 3 which is secured to the respective seat 2 extends in each case in a substantially radial manner and the longitudinal axis of the securing screw 5, with which the cutting insert 3 is secured to the seat, extends primarily in the tangential direction. Since the seats 2 are constructed substantially identically to each other and also the cutting inserts 3 which are arranged thereon are at least substantially identical to each other, only one seat 2 and the securing of a cutting insert 3 thereon are explained in greater detail below. The cutting insert 3 has a substantially polygonal basic shape having a lower side 83 and an upper side 34 which is opposite the lower side 33 and which is in the form of a cutting face, as can be seen in particular in FIG. 6. The lower side 33 and the upper side 34 are connected to each other by means of lateral faces. A through-hole 36 extends from the upper side 34 to the lower side 33 through the cutting insert 3. The auxiliary blade 31 and the main blade 32 are constructed along the transition from the upper side 34 to the lateral faces and connected to each other by means of a cutting corner 35. In the embodiment specifically illustrated, the cutting insert 3 has two-fold rotational symmetry with respect to the longitudinal axis of the through-hole 36 so that two cutting edge portions which each have a main blade 32 and an auxiliary blade 31 which is connected thereto by means of a cutting corner 35 are provided. As can be seen in FIG. 1, in the assembled state of the cutting insert 3 on the base member 1, one of the two cutting edge portions is located in an active position, in which the main blade 32 protrudes radially over the base member 1 and the auxiliary blade 31 protrudes axially over the base member 1, the other of the two cutting edge portions is located in an inactive position.

Although in the embodiment specifically illustrated a cutting insert 3 is shown, in which only at the transition from the upper side 34 to the lateral faces cutting edge portions are provided, in a modification, a double-sided configuration of the cutting insert is also possible in which at the transition from the lower side 33 to the lateral faces cutting edge portions are also provided.

The cutting insert 3 has a first lateral face 37 with which the cutting insert 3 is supported in a radially inward direction on the seat 2. The first lateral face 37 is formed at the side of the cutting insert 3 which is opposite the main blade 32 which is in the active position. As a result of the described two-fold rotational symmetry, there is also located below the main free face of the active main blade 32 an additional first lateral face 37 which is associated with the opposing inactive main blade 32.

The cutting insert 3 further has a second lateral face 38 with which the cutting insert 3 is supported axially and in a radially outward direction on the seat 2. The second lateral face 38 is formed at the side of the cutting insert 3 which is opposite the auxiliary blade 31 which is in the active position. As a result of the described two-fold rotational symmetry, there is also located at the side of the active auxiliary blade 31 an additional second lateral face 38 which is associated with the opposing inactive auxiliary blade 31.

The seat 2, in which the cutting insert 3 is retained, is described below in greater detail with reference to FIG. 3.

The seat 2 has a base face 21 for supporting the lower side 33 of the cutting insert 3, a first lateral abutment face 22 for abutting against the first lateral face 37 of the cutting insert 3 and a second lateral abutment face 23 for abutting against the second lateral face 38 of the cutting insert 3.

A surface normal of the base face 21 has a tangential direction component as a main component. In addition, the surface normal of the base face 21 may also further have smaller axial and/or radial direction components in terms of value.

The first lateral abutment face 22 supports the cutting inert 3 in a radially inward direction. The first lateral abutment face 22 may, for example, be in the form of a continuous face. However, for example, it is also possible for the first lateral abutment face 22 to have a plurality of part-faces which are separated from each other for support in a radially inward direction, as can be seen, for example, in FIG. 3. In order to bring about the support in a radially inward direction, the surface normal of the first lateral abutment face 22 has a radially outwardly directed direction component as a main component. The surface normal of the first lateral abutment face 22 may in this instance, for example, have only a radially outwardly directed direction component or may additionally also have even smaller tangential and/or axial direction components in terms of value.

The second lateral abutment face 23 supports the cutting insert 3 at the side thereof facing away from the free end 12 of the base member 1 both in the axial direction and in a radially outward direction. In order to bring this about, the surface normal of the second lateral abutment face 23 has both an axial direction component in the direction of the free end 12 of the base member 1 and a radially inwardly directed direction component. In addition, the surface normal of the second lateral abutment face 23 may also further have a small tangential direction component, as is the case, for example, in the second lateral abutment face 23 illustrated in FIG. 3.

Figure 3:
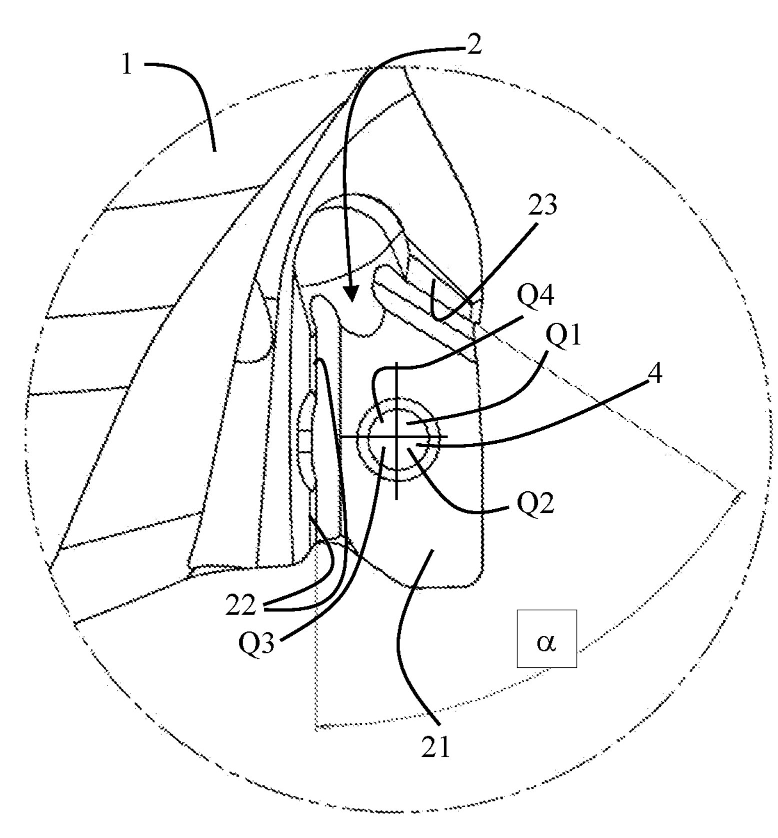
FIG. 3: shows an illustration corresponding to FIG. 2, but additionally without the cutting insert.

As can be seen in FIG. 3, the first lateral abutment face 22 and the second lateral abutment face 23 together enclose when viewed perpendicularly with respect to the base face 21 an inner angle $\alpha$ which is less than 75°, preferably less than 65°. In the embodiment specifically illustrated, the inner angle $\alpha$ is approx. 60°. The first lateral abutment face 22 encloses with the base face 21 an inner angle≥90°. The second lateral abutment face 23 encloses with the base face an inner angle≥90°. In the embodiment specifically illustrated, the inner angle between the base face 21 and the first lateral abutment face 22 is slightly larger than 90° and may, for example, be approximately 100°. In the same manner, the inner angle between the base face 21 and the second lateral abutment face 22 is slightly larger than 90° and may, for example, be approximately 100°. In the event of a double-sided configuration of the cutting insert 3, in which cutting edge portions are also formed at the transition from the lower side 33 to the lateral faces, the inner angle between the base face 21 and the lateral abutment faces 22,23 may preferably be 90° in each case.

Figure 5:
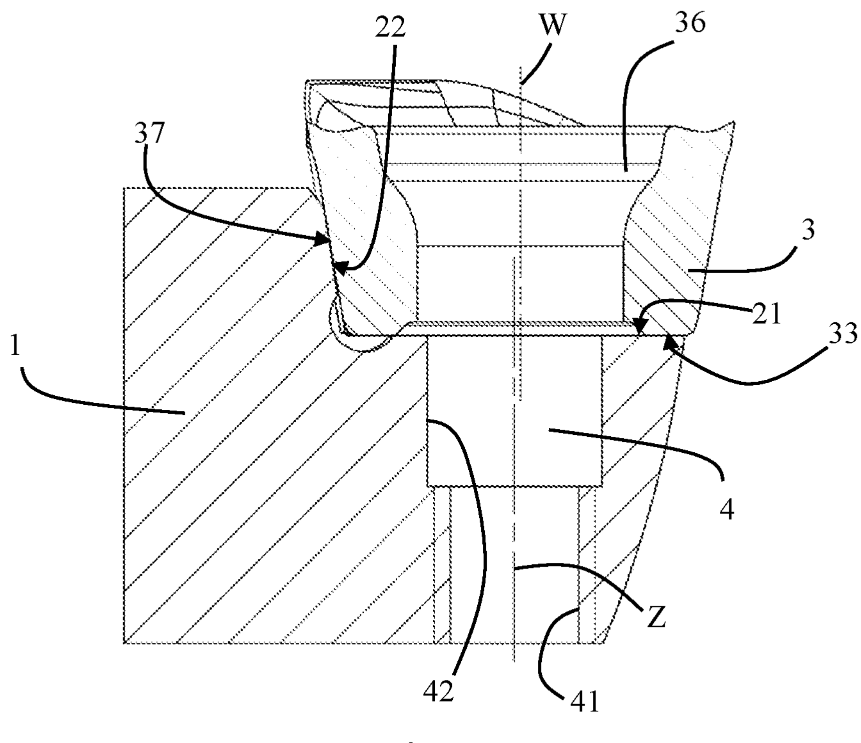
FIG. 5: shows a schematic sectioned illustration in a plane which contains the longitudinal axis of the threaded hole, in the region of the seat with the cutting insert arranged thereon, but without a securing screw.

As can be seen in FIG. 3 and FIG. 5, in the base face 21 of the seat 2 a hole 4 is formed. The hole 4 extends from the base face 21 into the material of the base member 1 and has in a region spaced apart from the base face 21 a threaded hole 41 with an inner thread for cooperating with a corresponding outer thread of the securing screw 5, as will be described in greater detail below. Between the threaded hole 41 and the opening of the hole 4 in the base face 21, a thread-free hole portion 42 is formed. In the embodiment specifically illustrated, the thread-free hole portion 42 has a circular cross section and extends coaxially with respect to the threaded hole 41. However, it is also possible for the thread-free hole portion 42 to have a different cross sectional shape.

Figure 4:
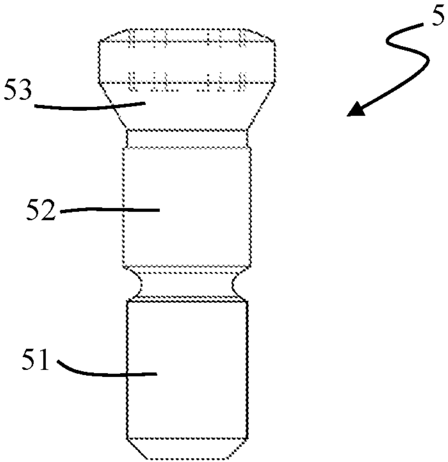
FIG. 4: shows a schematic illustration of the securing screw in the embodiment.

As can be seen in FIG. 4, the securing screw 5 has a threaded portion 52 which is configured for cooperation with the threaded hole 41, a head portion 53 and a thread-free shaft portion 52 which is arranged between the head portion 53 and the threaded portion 51. In the embodiment specifically illustrated, there is provided between the threaded portion 51 and the thread-free shaft portion 52 a tapered portion which promotes a relative resilient deflection of the head portion 53 with respect to the threaded portion 51 in a direction perpendicular to a longitudinal axis of the securing screw 5. The head portion 53 of the securing screw 5 is constructed to cooperate with the through-hole 36 in the cutting insert 3. The head portion 53 has a largest cross section which is greater than the smallest inner cross section of the through-hole 36 so that the head portion 53 cannot extend completely through the through-hole 36. The head portion 53 is adapted to the shape of the through-hole 36 in such a manner that the head portion 53 can be supported on the through-hole 36, in particular can preferably be supported in an annular manner. The thread-free shaft portion 52 of the securing screw 5 has a cross section which is significantly smaller than the cross section of the thread-free hole portion 42 of the hole 4. In other words, the thread-free hole portion 42 has with respect to the thread-free shaft portion 52 all around an excess dimension which is significantly greater than conventional tolerances with a precisely fitting production.

As illustrated in particular in FIG. 3, the thread-free hole portion 42 has four quadrants Q1, Q2, Q3 and Q4, which in this instance are numbered in the clockwise direction. A first quadrant Q1 of the thread-free hole portion 42 is located at the side, which faces away from the free end 12 of the base member 1 and which is located in a radially outward direction, of the thread-free hole portion 42. A second quadrant Q2 is located at the side of the free end 12 and at the radially outer side. A third quadrant Q3 is also located at the side of the free end 12, but at the radially inner side. A fourth quadrant Q4 is located at the side facing away from the free end 12 at the radially inner side. In other words, the first quadrant Q1 is located starting from a direction parallel with the rotation axis R in a range between "12 o'clock and 3 o-clock", the second quadrant Q2 is in a range between "3 o'clock and 6 o'clock", the third quadrant Q3 is in a range between "6 o'clock and 9 o'clock" and the fourth quadrant Q4 is in a range between "9 o'clock and 12 o'clock".

With reference to FIG. 7 to FIG. 10, it will now be described in greater detail below how the cutting insert 3 is retained on the seat 2 by means of the securing screw 5.

Figure 2:
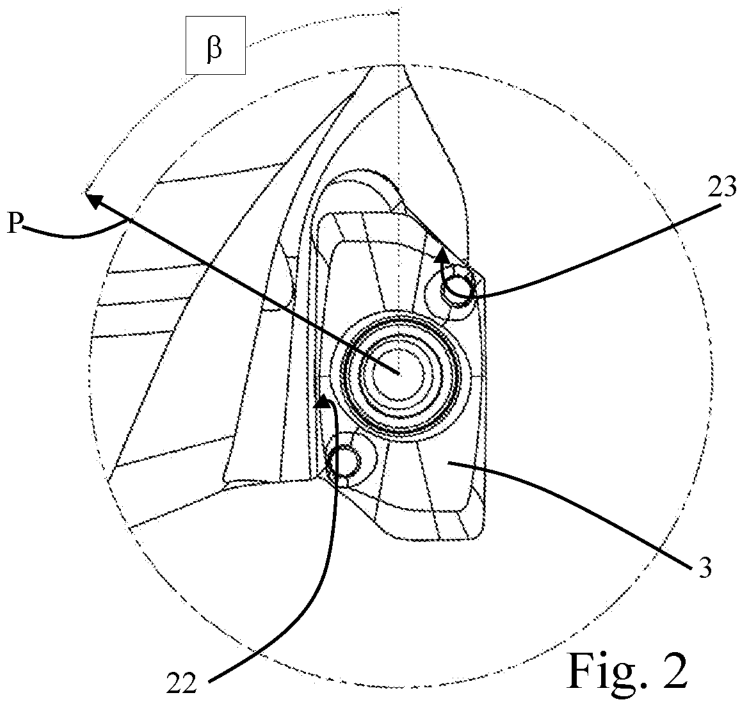
FIG. 2: shows an enlarged illustration of the seat with a cutting insert arranged thereon in the circled region B of FIG. 1, but without a securing screw.
Figure 7:
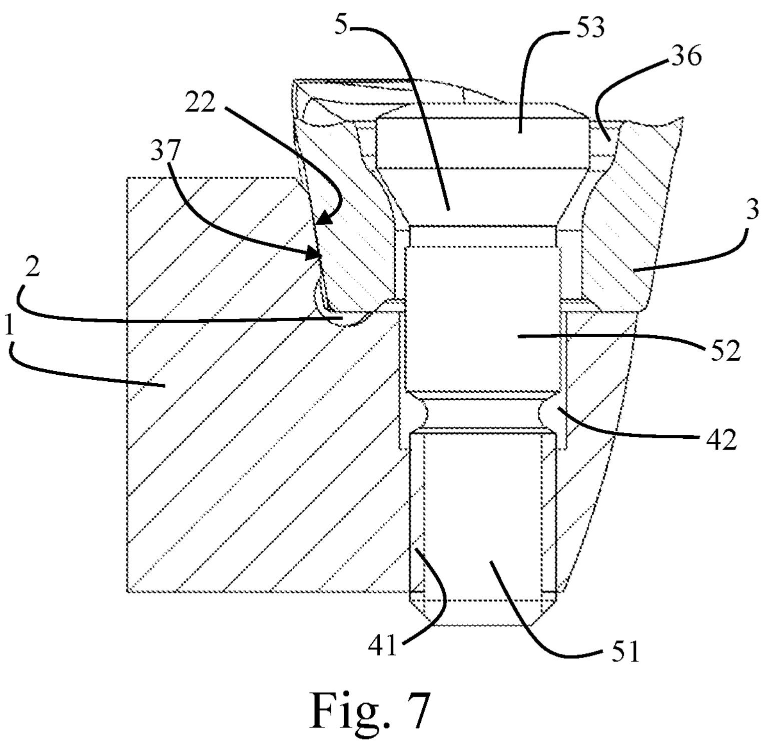
FIG. 7: shows a sectioned illustration which corresponds to FIG. 5 with the securing screw in a non-tightened state of the securing screw.
Figures 9, 10:
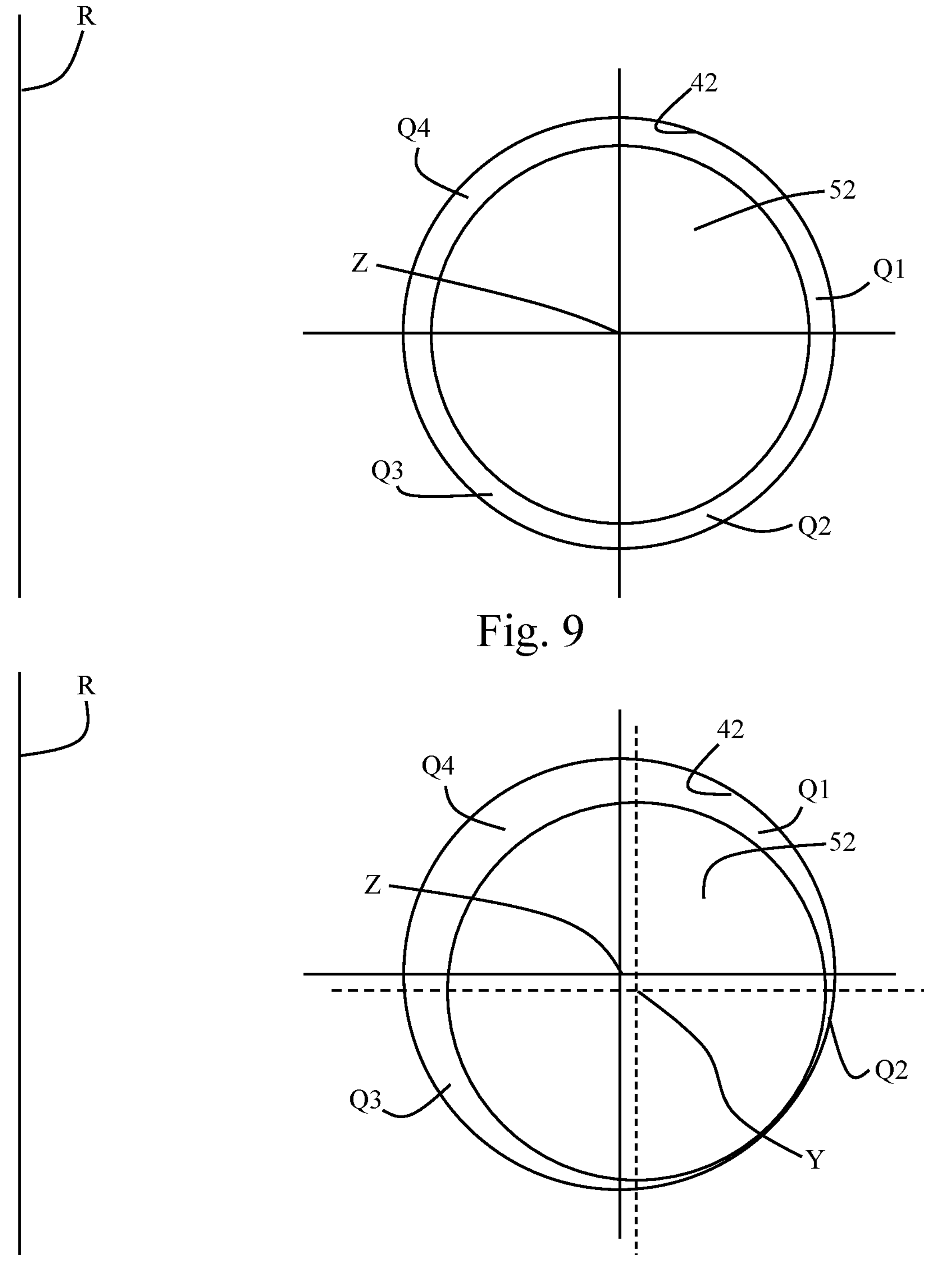
FIG. 9: shows a schematic sectioned illustration in a direction perpendicular to a longitudinal axis of the hole in the region of the thread-free hole portion with the securing screw in a non-tightened state.
FIG. 10: shows a schematic sectioned illustration which corresponds to FIG. 9, but with the securing screw in a tightened state.

First with reference to FIG. 7 and FIG. 9, the situation is described when the cutting insert 3 is arranged on the seat 2 and the securing screw 5 is guided with the threaded portion 51 thereof through the through-hole 36 of the cutting insert 3 so that the threaded portion 51 is in engagement with the threaded hole 41 and the thread-free shaft portion 52 is arranged in the thread-free hole portion 42 but the securing screw 5 has not yet been tightened. In this state, the thread-free shaft portion 52 is spaced apart at all sides from the thread-free hole portion 42 which is provided with an excess dimension, as can be seen in particular in FIG. 9. In other words, the thread-free shaft portion 52 is in this state both in the first quadrant Q1 and in the second quadrant Q2, in the third quadrant Q3 and in the fourth quadrant Q4 spaced apart from the thread-free hole portion 42. The longitudinal axis Z of the threaded hole 41 is slightly offset with respect to the longitudinal axis W of the through-hole 36 in the cutting insert both in the direction of the first lateral abutment face 23 and in the direction of the second lateral abutment face 23, as can be seen, for example, in FIG. 5. In FIG. 2, there is schematically illustrated with an arrow P (not to scale) the direction in which the longitudinal axis Z of the threaded hole 41 is displaced with respect to the longitudinal axis W of the through-hole 36. It can be seen that this direction extends in an inclined manner at an angle R with respect to the axial direction so that the direction has a radially inwardly directed direction component and a direction component which is directed axially towards the rear in the direction of the first end 11 of the base member 1. In the example specifically illustrated, the angle β is, for example, between 50° and 70°.

Figure 8:
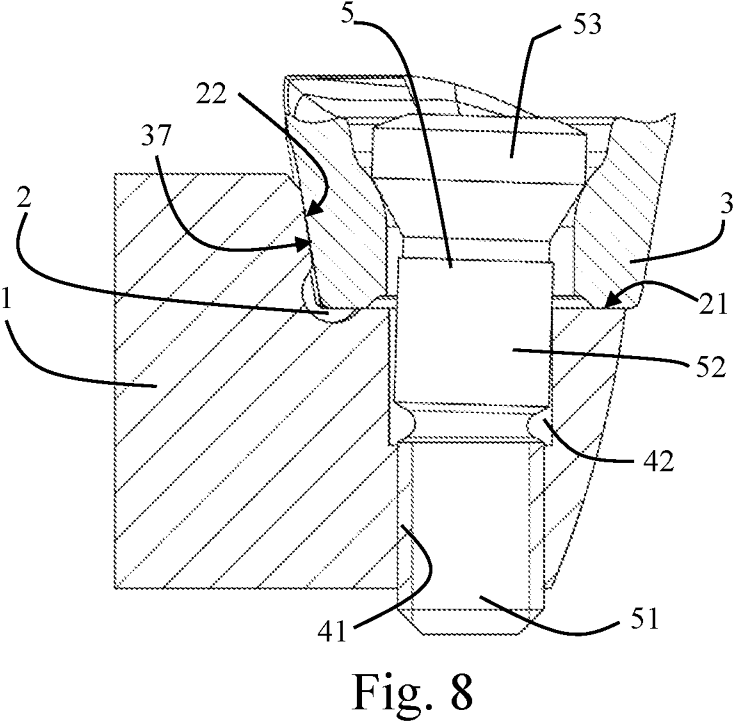
FIG. 8: shows a sectioned illustration corresponding to FIG. 7, but with the securing screw in a tightened state.

When the securing screw 5 is tightened, the threaded portion 51 is screwed deeper into the threaded hole so that the head portion 53 of the securing screw 5 moves into abutment with the through-hole 36 of the cutting insert 3. As a result of the described offset between the longitudinal axis W of the through-hole 36 and the longitudinal axis Z of the threaded hole 41, the head portion 53 in this instance first moves into abutment in the region of the through-hole 36 at the side between the first lateral abutment face 22 and the second lateral abutment face 23 of the seat 2. The cutting insert 3 is thereby pressed in the direction between the first lateral abutment face 22 and the second lateral abutment face 23. As a result of the abutment against the through-hole 36, the head portion 53 and with this the thread-free shaft portion 52 of the securing screw 5 is resiliently deflected in a radially outward direction and in the direction of the free end 12 of the base member 1 so that the thread-free shaft portion 52 is deflected into the second quadrant Q2 of the thread-free hole portion 42. The resilient deflection is carried out in this instance until the thread-free shaft portion 52 abuts in the second quadrant Q2 of the thread-free hole portion 42 against the thread-free hole portion 42. This state is illustrated in FIGS. 8 and 10. In FIG. 10, the resulting offset of the longitudinal axis Y of the securing screw 5 in the region of the thread-free shaft portion 52 with respect to the longitudinal axis Z of the threaded hole 41 is illustrated schematically. In addition to the securing in a radially outward direction via the second lateral abutment face 23, the cutting insert 3 is in this manner secured by means of the cooperation of the thread-free shaft portion 52 with the thread-free hole portion 42 at an additional position in a positive-locking manner in a radially outward direction so that the cutting insert 3 is secured in a particularly reliable manner with respect to centrifugal forces acting during the cutting processing operation. Since the support is carried out in the thread-free shaft portion 52, shearing forces caused by the centrifugal forces do not act on the securing screw 5 in the weaker threaded portion, but instead on the substantially more stable thread-free shaft portion 52, whereby the risk of a material failure of the securing screw 5 is reduced. As a result of resilient deformation of the securing screw 5, the head portion 52 of the securing screw 5 abuts in a positive-locking manner against the through-hole 36. In this case, the cooperation of the larger head portion 53 of the securing screw 5 with the smaller through-hole 36 of the cutting insert 3 tensions the cutting insert 3 in a reliable manner in the direction of the base face 21 and secures the cutting insert 3 in a positive-locking manner against being raised off the base face 21.

In the first quadrant Q1, the third quadrant Q3 and the fourth quadrant 4 of the thread-free hole portion 42, the thread-free shaft portion 52 of the securing screw 5 as a result of the excess dimension of the thread-free hole portion 42 is not in abutment when the securing screw 5 is tightened, as can be seen in particular in FIG. 10. Via the resilient deformation of the securing screw 5, until the thread-free shaft portion 52 moves into abutment with the thread-free hole portion 42, production tolerances of the cutting insert 3 and the first lateral abutment face 22 and the second lateral abutment face 23 can be readily compensated for over a relatively large range. Tolerances in the position and orientation of the first lateral abutment face 22 and the second lateral abutment face 23 relative to each other are in this instance compensated for by the thread-free shaft portion 52 in the second quadrant Q2 of the thread-free hole portion 42 moving into abutment either further in the direction of the free end 12 or further in a radially outward direction. The shape of the wall of the thread-free hole portion 42 in the second quadrant Q2, which shape is concave at the hole side in a circumferential direction, enables the problem-free orientation of the thread-free shaft portion 52 in this direction in this case. Although in the embodiment illustrated, a circular cross sectional shape of the thread-free hole portion 42 is shown and is particularly simple and cost-effective to produce in technical production terms, the cross sectional shape of the thread-free hole portion 42 is, however, not limited to such a circular shape, but instead other cross sectional shapes are possible, but the wall of the thread-free hole portion 42 should at least in the second quadrant preferably be constructed to be curved in a concave manner in a circumferential direction.

The invention claimed is:

1. A tool for cutting processing, the tool comprising:

a base member having a rotation axis about which the tool rotates during operation;

- a cutting insert being a replaceable cutting insert and having a lower side, a first lateral face, a second lateral face and a through-hole formed therein;
- at least one seat formed on said base member and securing said cutting insert;
- a securing screw for securing said cutting insert to said at least one seat;
- said at least one seat having a base face for supporting said lower side of said cutting insert, a first lateral abutment face for abutting against said first lateral face of said cutting insert, said first lateral abutment face supporting said cutting insert in a radially inward direction, and a second lateral abutment face for abutting against said second lateral face of said cutting insert, said second lateral abutment face supporting said cutting insert axially and in a radially outward direction, said base face of said at least one seat further having a hole formed therein for receiving said securing screw, said hole has with spacing from said base face a threaded hole and closer in a direction of said base face a thread-free hole portion;
- wherein said securing screw has a threaded portion for cooperating with said threaded hole, a head portion for supporting in said through-hole of said cutting insert and between said threaded portion and said head portion a thread-free shaft portion, said thread-free shaft portion has a smaller cross section than said thread-free hole portion;
- wherein said cutting insert is secured to said at least one seat such that said head portion of said securing screw is supported on said through-hole of said cutting insert, said threaded portion of said securing screw cooperates with said threaded hole, and said head portion of said securing screw is resiliently deflected such that said thread-free shaft portion is supported when viewed in a direction perpendicular to said base face in a second quadrant which is disposed in the radially outward direction and axially in a direction of a free end of the tool on said thread-free hole portion; and
- wherein said first lateral abutment face and said second lateral abutment face enclose in a viewing direction perpendicular to said base face an angle ($\alpha$)<75° with each other.

2. The tool according to claim 1, wherein said thread-free shaft portion, in a fourth quadrant which is disposed in the radially inward direction and faces away from the free end of the tool, is spaced apart from said thread-free hole portion.

3. The tool according to claim 1, wherein said head portion of said securing screw has a largest cross section perpendicularly to an axis of said securing screw which is greater than a smallest cross section of said through-hole.

4. The tool according to claim 1, wherein a longitudinal axis of said threaded hole is offset in a plane of contact between said head portion of said securing screw and said through-hole of said cutting insert with respect to a longitudinal axis of said through-hole in a direction towards said first lateral abutment face and in a direction towards said second lateral abutment face.

5. The tool according to claim 1, wherein a surface normal of said first lateral abutment face has a radially outwardly directed direction component as a main component.

6. The tool according to claim 1, wherein a surface normal of said second lateral abutment face has an axial direction component and a radially inwardly directed direction component.

7. The tool according to claim 1, wherein a surface normal of said base face has a tangential direction component as a main component.

8. The tool according to claim 1, wherein a wall of said thread-free hole portion at least in the second quadrant, which is located in the radially outward direction and axially in a direction of the free end of the tool, of said hole is constructed to be curved in a concave manner at a hole side in a circumferential direction.

9. The tool according to claim 1, wherein said thread-free hole portion has a circular cross section.

10. The tool according to claim 1, wherein said thread-free hole portion is constructed parallel with said threaded hole.

11. The tool according to claim 1, wherein said first lateral abutment face and said second lateral abutment face enclose in a viewing direction perpendicular to the base face an angle ($\alpha$)<65° with each other.

12. A tool for cutting processing, the tool comprising:

- a base member having a rotation axis about which the tool rotates during operation;
- a cutting insert being a replaceable cutting insert and having a lower side, a first lateral face, a second lateral face and a through-hole formed therein;
- at least one seat formed on said base member and securing said cutting insert;
- a securing screw for securing said cutting insert to said at least one seat;
- said at least one seat having a base face for supporting said lower side of said cutting insert, a first lateral abutment face for abutting against said first lateral face of said cutting insert, said first lateral abutment face supporting said cutting insert in a radially inward direction, and a second lateral abutment face for abutting against said second lateral face of said cutting insert, said second lateral abutment face supporting said cutting insert axially and in a radially outward direction, said base face of said at least one seat further having a hole formed therein for receiving said securing screw, said hole has with spacing from said base face a threaded hole and closer in a direction of said base face a thread-free hole portion;
- wherein said securing screw has a threaded portion for cooperating with said threaded hole, a head portion for supporting in said through-hole of said cutting insert and between said threaded portion and said head portion a thread-free shaft portion, said thread-free shaft portion has a smaller cross section than said thread-free hole portion;
- wherein said cutting insert is secured to said at least one seat such that said head portion of said securing screw is supported on said through-hole of said cutting insert, said threaded portion of said securing screw cooperates with said threaded hole, and said head portion of said securing screw is resiliently deflected such that said thread-free shaft portion is supported when viewed in a direction perpendicular to said base face in a second quadrant which is disposed in the radially outward direction and axially in a direction of a free end of the tool on said thread-free hole portion; and
- wherein a longitudinal axis of said threaded hole is offset in a plane of contact between said head portion of said securing screw and said through-hole of said cutting insert with respect to a longitudinal axis of said through-hole in a direction towards said first lateral abutment face and in a direction towards said second lateral abutment face.

13. The tool according to claim 12, wherein said thread-free shaft portion, in a fourth quadrant which is disposed in the radially inward direction and faces away from the free end of the tool, is spaced apart from said thread-free hole portion.

14. The tool according to claim 12, wherein said head portion of said securing screw has a largest cross section perpendicularly to an axis of said securing screw which is greater than a smallest cross section of said through-hole.

15. The tool according to claim 12, wherein a surface normal of said first lateral abutment face has a radially outwardly directed direction component as a main component.

16. The tool according to claim 12, wherein a surface normal of said second lateral abutment face has an axial direction component and a radially inwardly directed direction component.

17. The tool according to claim 12, wherein a surface normal of said base face has a tangential direction component as a main component.

18. The tool according to claim 12, wherein a wall of said thread-free hole portion at least in the second quadrant, which is located in the radially outward direction and axially in a direction of the free end of the tool, of said hole is constructed to be curved in a concave manner at a hole side in a circumferential direction.

19. The tool according to claim 11, wherein said thread-free hole portion has a circular cross section.

20. The tool according to claim 12, wherein said thread-free hole portion is constructed parallel with said threaded hole.

21. The tool according to claim 12, wherein said first lateral abutment face and said second lateral abutment face enclose in a viewing direction perpendicular to the base face an angle $(\alpha)<65°$ with each other.

* * * * *